Feb. 14, 1939.  C. APPLETON  2,146,877

ROTARY INTERNAL COMBUSTION ENGINE

Filed June 24, 1937  4 Sheets-Sheet 1

Inventor
Charles Appleton
By Albert E. Dieterich
Attorney

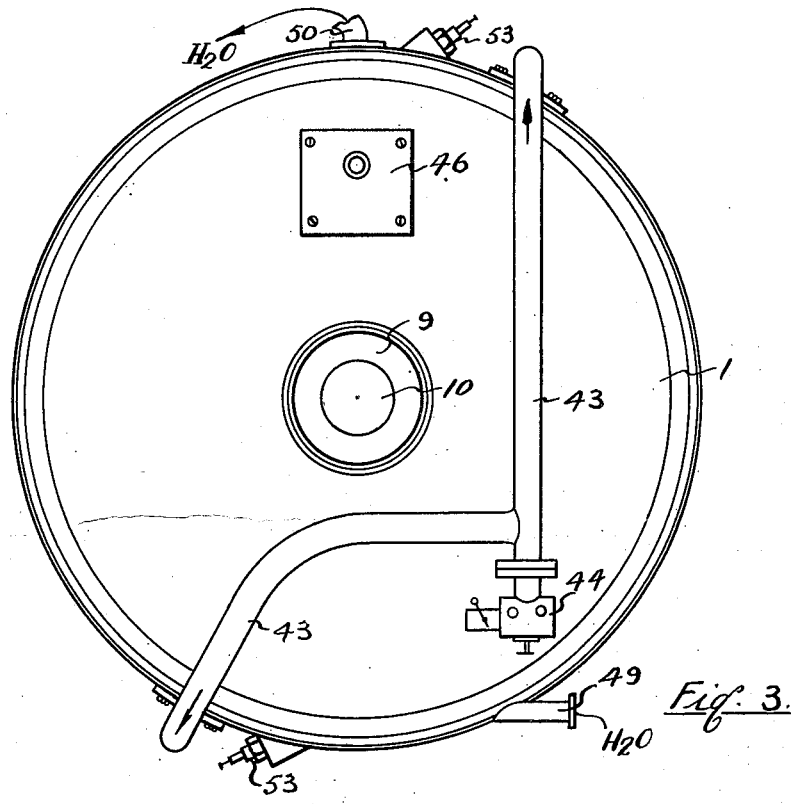
Fig. 3.
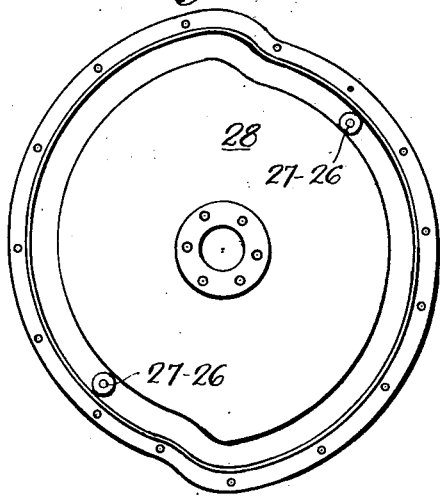
Fig. 4.
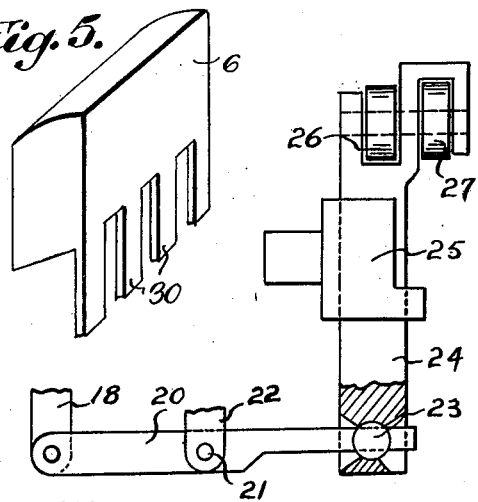
Fig. 5.
Fig. 6.
Inventor
Charles Appleton
By Albert F. Dieterich
Attorney Feb. 14, 1939.  C. APPLETON  2,146,877
ROTARY INTERNAL COMBUSTION ENGINE
Filed June 24, 1937  4 Sheets-Sheet 3

Inventor
Charles Appleton
By Albert B. Dietrich
Attorneys

Feb. 14, 1939. C. APPLETON 2,146,877
ROTARY INTERNAL COMBUSTION ENGINE
Filed June 24, 1937 4 Sheets-Sheet 4

Inventor
Charles Appleton
Albert F. Dieterich
Attorney

Patented Feb. 14, 1939

2,146,877

UNITED STATES PATENT OFFICE 2,146,877

ROTARY INTERNAL COMBUSTION ENGINE

Charles Appleton, Vancouver, British Columbia, Canada

Application June 24, 1937, Serial No. 150,211

9 Claims. (Cl. 123—8)

This invention relates to rotary type internal combustion engines adapted for general power purposes and it may be adapted for stationary, marine, automotive and airplane purposes.

My invention lends itself to either water cooling or air cooling, and an object of my invention has been to provide an engine of this kind that is practically valveless, of few and simple parts, sturdy in construction and free of excessive complications.

A further object of my invention has been to provide an engine having a balanced torque, free of vibration and requiring few adjustments to keep it in proper running order.

My invention comprises a hollow rotor having a spoked hub the arms of which, if desired, may be angularly disposed to act as fan blades for setting up an air circulation.

The main rotor body carries multiple square pistons in the rim, which pistons are actuated through inwardly projecting plunger-rods connected to lever linkages traversing a fixed cam, whereby reciprocation of the pistons is effected for drawing in and compressing the fuel charge of the engine.

My invention and the nature of same, will be more readily understood by reference to the following detailed specification and the accompanying drawings forming part of this application, and in which:

Fig. 3 is a side elevation of the engine and shows the mounting of the intake manifold, spark plugs and the make and break ignition panel on the front of the housing.

Fig. 4 is a detail elevation of the cams with the rollers located between the same, the view being taken on line 4—4 of Fig. 2 looking in the direction of the arrow.

Fig. 5 is a detail perspective view of one of the piston vanes, illustrating the guide fingers formed on one end and the side thereof.

Fig. 8 is a view similar to Fig. 7, but showing the position of the parts which they assume at the completion of the exhaust stroke.

Figures 10, 11:
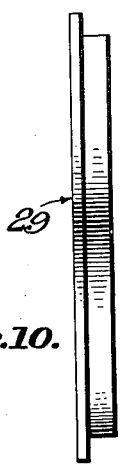

Figs. 10 and 11 are side elevations of the stationary cams 29 and 28 respectively.

Figure 12:
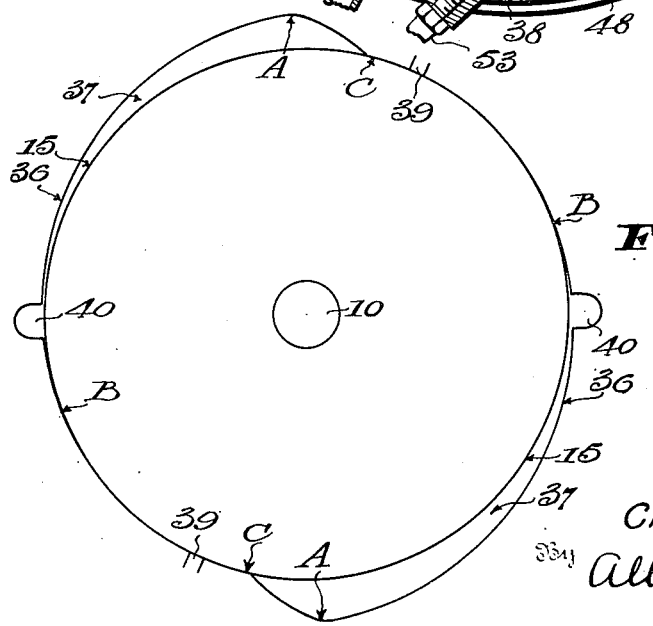

Fig. 12 is a diagrammatic view showing the peripheral curve of the rotor and the relation of the same to the inner periphery of the wall 36 of the casing.

In these drawings like numerals indicate like parts throughout all the views, and the numeral 1 indicates the outer end casings of a rotary engine which has a central section 2 in which rotates a hollow rotor member 3.

Within the rotor member 3 there are formed two square piston housings 4, in each of which there are mounted a piston 5 and a piston vane 6.

The outer end casings 1 are secured to the central section 2 by the screws or bolts 7 which also secure the outer cover 8 of the water jacket.

Each of the outer end casings 1 has bearings 9 in the center thereof, and these bearings concentrically mount the end casings 1 and central section 2 upon the main shaft 10 upon which rotor member 3 is mounted.

The rotor member 3 has a hub 11 and spokes 12 carrying a wide rim 13 upon the outer periphery of which are formed two projecting side flanges 14 which form the side walls to the piston housings 4. (See Fig. 2.)

Between the side wall rotor flanges 14 is mounted the outer peripheral wall 15 of the rotor proper which is in two sections. Each section has end walls 16 having a concentric flange portion 17 for bolting on to the wide rim 13 of the rotor member 3.

The end walls 16 together with the side flanges 14 of the rotor complete the housings 4 of the pistons 5 and piston vanes 6.

To the center of each square piston is mounted a piston rod 18 which projects through a bushing 19 mounted in the rim 13 of the rotor into the inner space of the main rotor body.

The inner end of the piston rod 18 is connected to the end of a lever 20 which is pivoted at 21 to a pivoted link 22 mounted upon the inner periphery of the wide rim 13 of the rotor.

The outer end of the lever 20 is mounted in a swivel bushing 23 carried in the lower end of a cam rod 24 which is slidably mounted in a guide 25 secured upon one end of the wide rim 13 of the rotor. (See Figure 2.)

The upper end of the cam rod 24 carries two cam rollers 26 and 27, the outer cam roller 27 traversing a fixed and stationary cam 28 mounted within one of the end casings 1 and being bolted to the inner face of the central bearing 9.

The roller 26 contacts with a flanged cam 29 bolted upon one face or side of the central section 2 and both the cams 28 and 29 are of complementary profile to each other. (See Figure 4.)

Figure 6:
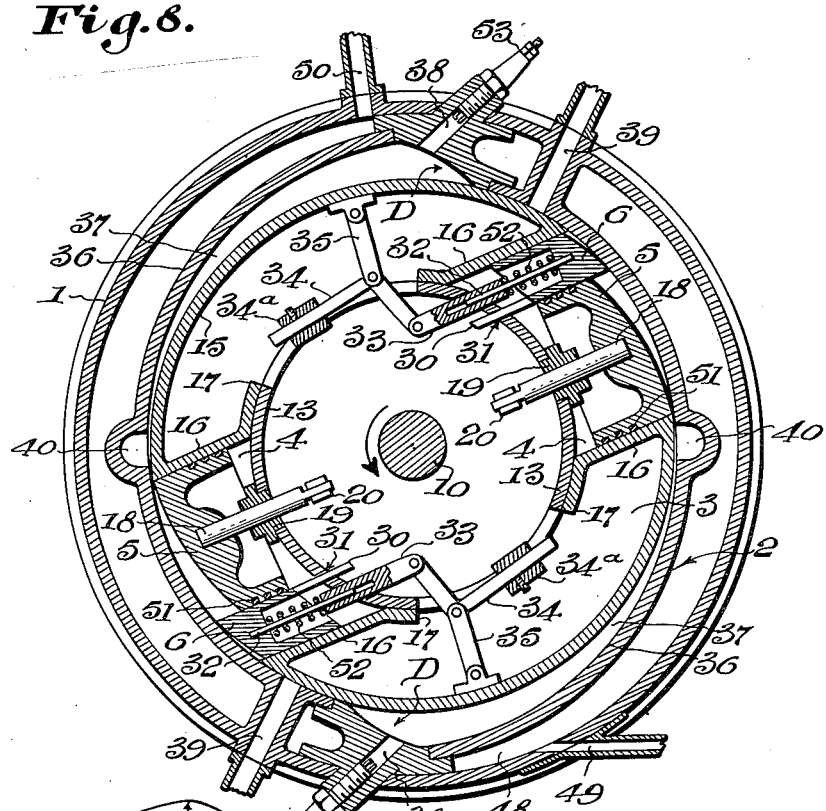
Fig. 6 is a detail view, parts being broken away, of the cam roller arm, its guide and the pivoted piston lever at the roller end of the arm.

It should be understood that there are two units such as are shown in Fig. 6, one for each piston 5.

Within the piston housing 4, which in effect comprises a cylinder, and upon the forward side of the piston 5 is mounted a hollow piston vane 6, (see Fig. 1), which is of rectangular shape and has a head curvature corresponding with the curvature of the central section 2.

Figure 1:
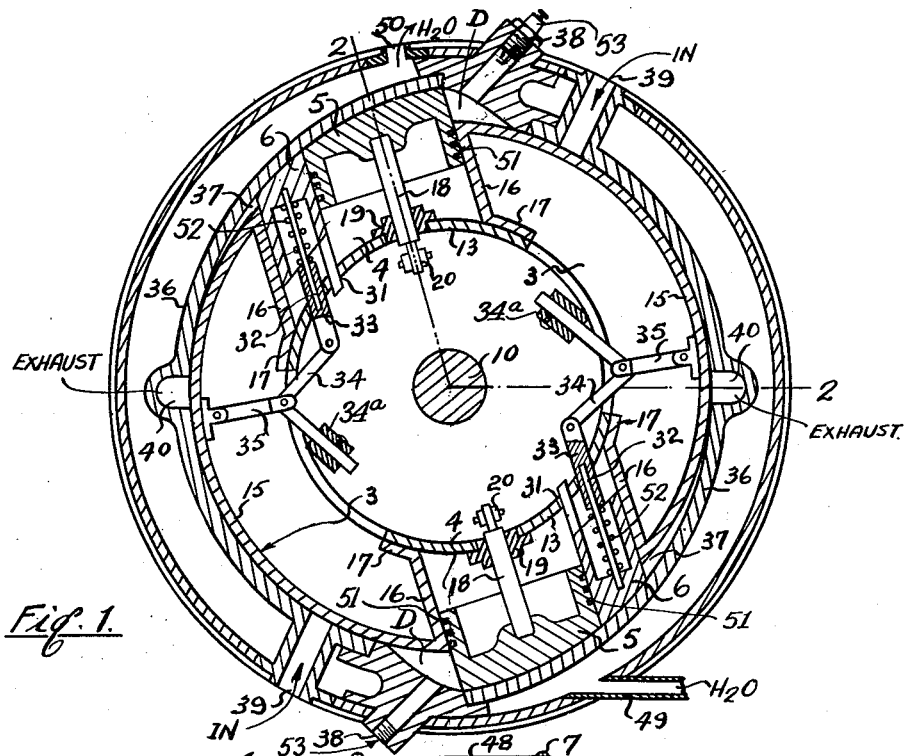
Fig. 1 is a vertical, cross-sectional view of an engine showing the arrangement and mounting of the principal elements, the pistons being shown at their top dead center positions.
Figure 2:
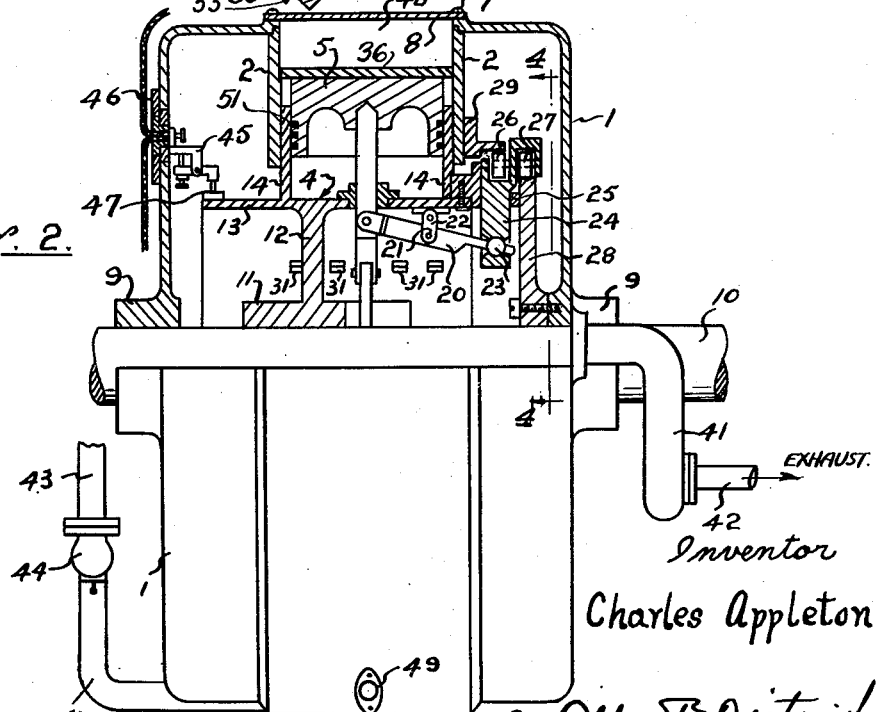
Fig. 2 is a longitudinal section and part elevation on the line 2—2 of Fig. 1.

One side of the piston vane 6 is elongated and divided to form a series of square fingers 30 which project through apertures 31 formed in the wide rim 13 of the rotor. (See Figure 5 illustrating the fingers and Figures 1 and 2 illustrating fingers projecting through rim 13.)

The finger side of the piston vane 6 comprises a side wall and guide to the piston 5. Within the hollow of the piston vane 6 is mounted a rod 32, the lower end of which is mounted slidably within a bore of a pivoted rod 33, the lower end of which is connected to a counterbalanced bell crank lever 34 that is pivoted to a pivoted link member 35 connected upon the inner periphery of the outer peripheral wall 15 of the rotor. (See Figure 1.) 34a is a counterbalancing weight on lever 34.

The outer walls 36 of the central section or portion 2 of the engine are formed to comprise tangential passages 37 (corresponding in number to the number of pistons 5) and have spark plug openings 38 at the large end of the passages and intake ports 39 a little in advance of the plug openings 38.

Suitably located exhaust ports 40 are provided to permit of the escape of the burnt gases. The exhaust ports 40 are connected to a U-shaped exhaust manifold 41 mounted upon one end of the engine which in turn connects to an exhaust outlet 42.

The intake ports 39 are connected on the opposite side of the engine to an intake manifold 43 to which is connected the carburettor 44.

Ignition is effected through a make and break mechanism 45 mounted upon a panel 46 bolted upon the outer face of one of the end casings 1 (see Figure 3) and through which the spark plug wires extend.

The make and break mechanism is operated or actuated by a cam member 47 mounted upon and adjacent the edge of the wide rim 13.

The central section 2 is surrounded by a water jacket 48 which has an inlet connection 49 at the bottom of the engine and an outlet or discharge 50 positioned at the top.

The pistons 5 are provided, on each of their four sides, with compression or packing strips 51 to function after the manner of piston rings to secure a tight seal around the walls of the piston chambers.

Upon the rods 32 of the piston vanes 6 is mounted a helical compression spring 52 for the purpose of forcing outwardly the piston-vanes 6 to keep the same in contact with the undulations of the inner face of the central section 2 or main body housing of the engine as the rotor 3 is revolved.

The spark plug openings 38 are fitted with the usual spark plugs 53.

As shown in Fig. 12, the outer face of wall 15 of the rotor and the inner face of wall 36 of the central section of the casing are concentric for only short distances, i. e., between the intake ports 39 and the exhaust ports 40; thus it may be said that the tangential passages 37 (which constitute what might be called the working chambers of the engine) extend between the points A and B in the direction of rotation (counter-clockwise in Figs. 1, 7 and 8) of the rotor. (See Fig. 12.)

It is to be observed that the outer faces of the pistons 5 conform in curvature to that portion of the peripheral wall 36 which is located at the beginning of the working chambers or tangential passages 37. Some portion of the outer faces of the pistons 5 always remains in contact with the wall 36, except for the small steep portions A—C, and while the pistons are drawing in a fresh charge. During the working strokes the pistons 5 serve as power abutments.

In operation the engine functions as follows. The main shaft 10, on which is mounted the hollow rotor member 3, is revolved either manually or by a suitable starter for the purpose of drawing in a charge from the carburettor 44 through the intake ports 39.

Figure 7:
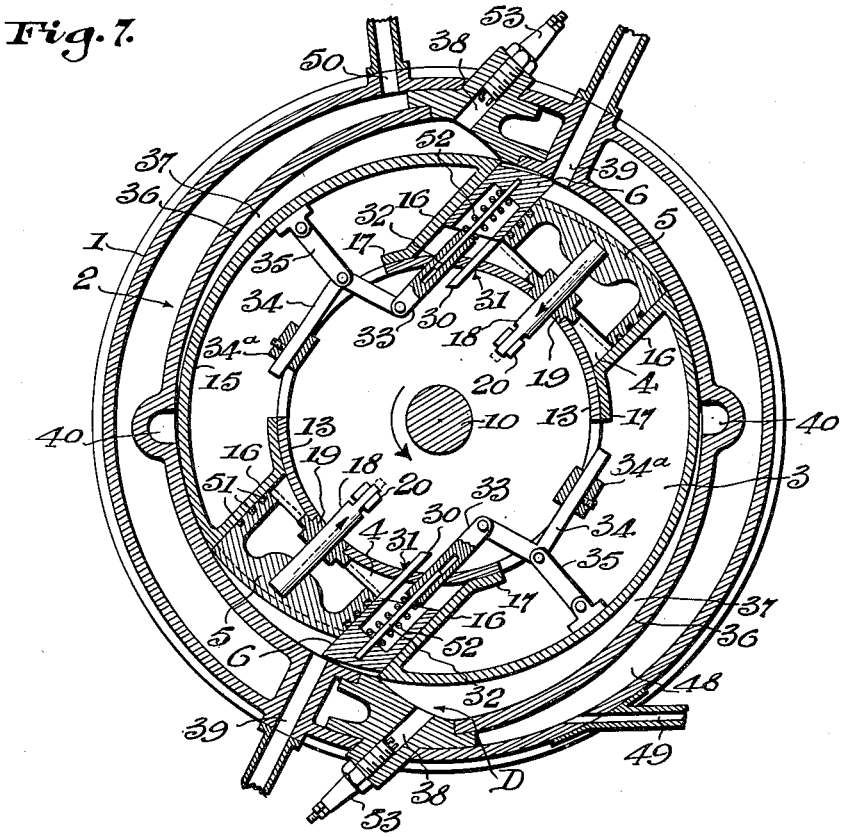
Fig. 7 is a view similar to Fig. 1, but showing the parts in the position they assume at the commencement of the suction or intake stroke of the pistons.
Figure 9:
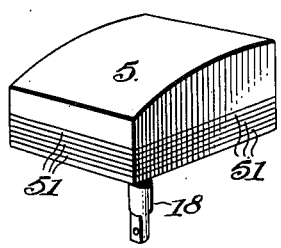
Fig. 9 is a detail perspective view of one of the power pistons.

Referring first to Fig. 7, let us assume that a spent charge has been exhausted from each of the chambers 37 via their respective ports 40; also assume that the ports 39 have just been uncovered by the piston vanes and are now in communication with the piston housings; also assume that the rotor is turning counter-clockwise in Figs. 1, 7 and 8.

At this time any gases remaining in chambers 37 will be atmospheric pressure since 37 are open through exhaust ports 40; also rollers 26 and 27 will have entered the lowest "dips" of the cams 28 and the cams 28—29 are moving the pistons 5 inwardly, thereby drawing fresh charges through the ports 39 into the piston housings 4. On moving onward the piston vanes 6 follow the contour of the inner faces of the wall 36 in advance of the pistons 5 and hence close off the escape of the fresh charges from housings 4 while the pistons 5 pass ports 39. As soon as the pistons 5 pass the ports 39 and the rear edges of the pistons pass points A (Fig. 12), the pistons are rapidly pushed outwardly by the action of the cam 28, thereby compressing the fresh charges into the spaces D in Fig. 1.

As soon as the parts reach the position shown in Fig. 1, the compressed charges are fired by the spark plugs and the rotor is impelled under the exploded charges at the rear or following sides of the pistons 5.

As the parts move from the position in Fig. 1 to that of Fig. 8, piston vanes 6 will push the spent or inert gases in advance of the piston vanes in chambers 37 out through the exhaust ports 40. As soon as the pistons 5 pass the ports 40 (see Fig. 8) the exploded charges in chambers 37 will pass through the exhaust ports 40 which are now in communication with the chambers 37 and the cycle of operation will be substantially complete.

It will be observed, from the above, that the piston vanes 6 serve the function of scavenging vanes, as well as cut-off vanes, to prevent the fresh charges, during the compression movement of the pistons 5, from passing along the passages 37 to the exhaust ports 40; also, the pistons 5 not only serve as power abutments, but as pumps to draw in and to compress new charges of fuel.

Again, it is to be observed that when the explosions occur the forces of the expanding gases are not applied to the outer ends of the pistons 5 (which forces if so applied would tend to drive the pistons inwardly), but are applied to the back walls of the pistons 5, and thereby cause the pistons to be pressed toward the piston vanes 6.

The centrifugal action or force exerted upon the piston vanes 6 is counterbalanced by the counterbalanced bell crank lever 34 and hence no undue outer force or scraping action is set up by the vanes 6 upon the inner walls of the engine.

Having now described my invention and the nature of same, what I claim and desire to be protected in, by Letters Patent, is:—

1. In a valveless rotary engine of the kind described having suitable cooling means, an exhaust outlet, an intake manifold and carburettor, the combination comprising, a central housing having end covers thereto, tangential passages formed in said housing, intake ports, spark plugs at one end of said passages, a rotor having a hollow rim mounted in said housing, piston compartments formed in said hollow rim, pistons and piston vanes mounted in said compartments, means to actuate said piston vanes, and means to actuate said pistons to draw in a fuel charge from said carburettor and thereafter extend said pistons into said tangential passages to compress the fuel and to act as power abutments whereby when said fuel charge is ignited and expanded it causes said rotor to revolve within said housing.

2. In a valveless rotary engine of the kind described having suitable cooling means, an exhaust outlet, an intake manifold and carburettor, the combination comprising, a central housing having end covers thereto, tangential passages formed around the inner periphery of said housing, intake ports and spark plugs, a rotor having a wide inner rim and an outer hollow rim built thereupon mounted within said housing, piston compartments formed within said hollow rim, piston vanes and pistons and rods mounted within said compartments, means to actuate said piston vanes, means reciprocating said pistons, to cause the latter to project beyond the outer rim of said rotor into the tangental passages of said housing and form power abutments to said rotor whereby an ignited fuel charge may be made to exert pressure thereagainst to cause said rotor to revolve within said housing.

3. In a valveless rotary engine of the kind described having cooling means, an exhaust outlet, an intake manifold and carburettor, the combination comprising, a central housing having tangental passages formed around its inner periphery and end covers thereto, intake ports and spark plugs, a hollow rimmed rotor mounted within said housing, piston compartments formed in said hollow rim, piston vanes and pistons mounted within said compartments, means to actuate said piston vanes, means reciprocating said pistons to cause the latter to project beyond the hollow rim of said rotor to form power abutments thereto, means to draw in a fuel charge through said intake ports and deliver the same to said tangential passages, means to cause said pistons to compress said fuel charge, and means igniting said fuel charge to cause the latter to exert pressure against the abutments formed by said pistons whereby the rotor is caused to revolve within said housing.

4. In a rotary explosion engine, a stationary casing, a rotor mounted to turn on its axis in said casing, said rotor having a piston housing, a reciprocating piston in said housing, said housing having a peripheral wall surrounding said rotor and provided with a tangential space constituting a working chamber, said casing having a fuel inlet port in advance of said working chamber which port is normally closed by the periphery of said rotor, said casing having an exhaust port communicating with said working chamber, a reciprocating piston and a piston vane in said piston housing, means continuously urging said piston vane into contact with the peripheral wall of said housing in advance of said piston, and means to reciprocate said piston to draw in a new charge from the fuel inlet port as the piston passes the port and thereafter advance the piston into the working chamber to contact the peripheral wall thereof and compress the new charge in the working chamber at the back side of the piston, and means to fire the compressed charge, the piston then serving as a power abutment.

5. In a rotary explosion engine, a stationary casing, a rotor mounted to turn on its axis in said casing, said rotor having a piston housing, a reciprocating piston in said housing, said housing having a peripheral wall surrounding said rotor and provided with a tangential space constituting a working chamber, said casing having a fuel inlet port in advance of said working chamber which port is normally closed by the periphery of said rotor, said casing having an exhaust port communicating with said working chamber, a reciprocating piston and a piston vane in said piston housing, means continuously urging said piston vane into contact with the peripheral wall of said housing in advance of said piston, means to reciprocate said piston to draw in a new charge from the fuel inlet port as the piston passes the port and thereafter advance the piston into the working chamber to contact the peripheral wall thereof and compress the new charge in the working chamber at the back side of the piston, means to fire the compressed charge, the piston then serving as a power abutment, and means to counterbalance the action of centrifugal force on said piston vanes so that no undue scraping action will take place between said piston vanes and said peripheral wall.

6. In a rotary explosive engine, a casing, a rotor mounted in said casing, a plurality of reciprocating pistons and sliding piston vanes in said rotor, said casing having a plurality of working chambers with which said pistons and piston vanes cooperate, said pistons each serving the two-fold function of a charging and compressing pump and a power abutment, and means to reciprocate said pistons inwardly to draw fresh fuel charges into the rotor and outwardly to compress said charges in the working chambers, means continuously acting to hold said piston vanes, while in said working chambers, to act as cut-offs against escape of fresh fuel charges and to act as scavenging vanes to push out preceding spent charges, said casing having a plurality of inlet ports for cooperation with said pistons and having an exhaust port for each working chamber.

7. In a rotary explosive engine, a casing, a rotor mounted in said casing, a plurality of reciprocating pistons and sliding piston vanes in said rotor, said casing having a plurality of working chambers with which said pistons and piston vanes cooperate, said pistons each serving the two-fold function of a charging and compressing pump and a power abutment, means to reciprocate said pistons inwardly to draw fresh fuel charges into the rotor and outwardly to compress said charges in the working chambers, and means continuously acting to hold said piston vanes, while in said working chambers, to act as cut-offs against escape of fresh fuel charges and to act as scavenging vanes to push out preceding spent charges, said casing having a plurality of inlet ports for cooperation with said pistons and having an exhaust port for each working chamber, said continuously acting means comprising springs.

8. In a rotary explosive engine, a casing, a rotor mounted in said casing, a plurality of reciprocating pistons and sliding piston vanes in said rotor, said casing having a plurality of working chambers with which said pistons and piston vanes cooperate, said pistons each serving the two-fold function of a charging and compressing pump and a power abutment, means to reciprocate said pistons inwardly to draw fresh fuel charges into the rotor and outwardly to compress said charges in the working chambers, means continuously acting to hold said piston vanes, while in said working chambers, to act as cut-offs against escape of fresh fuel charges and to act as scavenging vanes to push out preceding spent charges, said casing having a plurality of inlet ports for cooperation with said pistons and having an exhaust port for each working chamber, said continuously acting means comprising springs, and means to counterbalance the action of centrifugal force on said piston vanes.

9. In a rotary explosive engine, a casing, a rotor mounted in said casing, a plurality of reciprocating pistons and sliding piston vanes in said rotor, said casing having a plurality of working chambers with which said pistons and piston vanes cooperate, said pistons each serving the two-fold function of a charging and compressing pump and a power abutment, means to reciprocate said pistons inwardly to draw fresh fuel charges into the rotor and outwardly to compress said charges in the working chambers, and means continuously acting to hold said piston vanes, while in said working chambers, to act as cut-offs against escape of fresh fuel charges and to act as scavenging vanes to push out preceding spent charges, said casing having a plurality of inlet ports for cooperation with said pistons and having an exhaust port for each working chamber, said piston-reciprocating means comprising shaped cams and connections between said pistons and said cams by virtue of which said cams cause said pistons to follow the contour of the outer peripheries of said working chambers while said pistons are acting as power abutments and for drawing said pistons entirely into the confines of the rotor while the pistons are passing the inlet ports to draw in fresh charges and thereafter expel and compress the same into the working chambers.

CHARLES APPLETON.